United States Patent [19]

Akiyama

[11] Patent Number: 4,758,817
[45] Date of Patent: Jul. 19, 1988

[54] ACOUSTIC APPARATUS WITH THEFT DETECTOR FOR AUTOMOBILE

[75] Inventor: Tsuneo Akiyama, Yokohama, Japan

[73] Assignee: Shintom Kabushiki Kaisha, Kanagawa, Japan

[21] Appl. No.: 946,871

[22] Filed: Dec. 24, 1986

[30] Foreign Application Priority Data

Dec. 25, 1985 [JP] Japan ............................ 60-290740

[51] Int. Cl.$^4$ ............................................. B60R 25/00
[52] U.S. Cl. .................................... 340/63; 340/568;
340/571; 70/158; 70/160; 455/345; 455/346;
455/348; 455/90; 307/10 AT
[58] Field of Search ............... 340/63, 65, 541, 571,
340/546, 568, 64, 825.31, 825.32; 70/58, 158,
163, 160, DIG. 49; 455/344–349, 89, 90; 307/10
AT

[56] References Cited

U.S. PATENT DOCUMENTS

| | | | |
|---|---|---|---|
| 4,211,976 | 7/1980 | Inoue | 455/345 |
| 4,211,995 | 7/1980 | Smith | 455/345 |
| 4,248,069 | 2/1981 | Burbank | 455/345 |
| 4,494,114 | 1/1985 | Kaish | 340/63 |

Primary Examiner—Donnie L. Crosland
Attorney, Agent, or Firm—Bruce L. Adams; Van C. Wilks

[57] ABSTRACT

An acoustic apparatus such as a radio receiver and tape player is mounted into an interior panel such as a dashboard of an automobile. The acoustic apparatus includes a housing having a size insertable into an aperture formed in the interior panel. The housing is inserted through the aperture from the front side of the interior panel and is firmly attached to the interior panel by manually actuating mount knobs provided in the front of the housing. A theft detecting circuit arrangement including a switch operable from the front side of the housing is provided in the housing and protective members are provided for covering the mount knobs. The protective members include operating plates for operating the switch. Upon the detachment of the protective member, the electric circuit arrangement is actuated to produce a warning signal to prevent the detachment of the acoustic apparatus from the interior panel without permission.

15 Claims, 2 Drawing Sheets

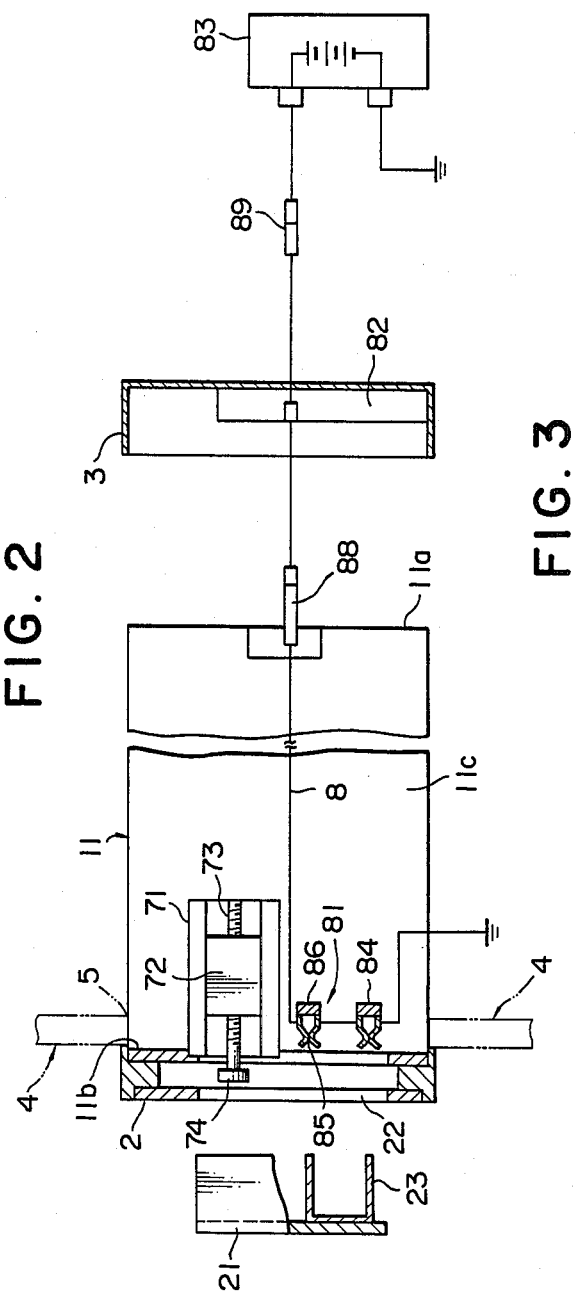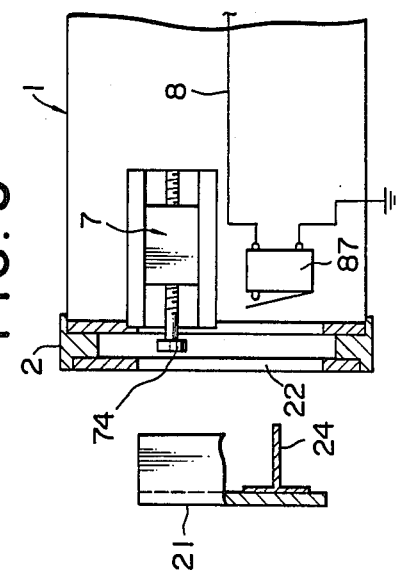

ACOUSTIC APPARATUS WITH THEFT DETECTOR FOR AUTOMOBILE

FIELD OF THE INVENTION

The present invention relates to an acoustic apparatus such as a radio receiver and/or tape player that can be mounted into an interior panel such as a dashboard or console panel of automobiles, and more particularly to an acoustic apparatus with a theft detector for automobiles that can respond to the detachment of the acoustic apparatus from an interior panel.

BACKGROUND OF THE INVENTION

Various types of mount structures of an acoustic apparatus to an interior panel of an automobile have been known. In U.S. Pat. No. 4,211,976, issued July 8, 1980, entitled "COMPOUND ACOUSTIC APPARATUS FOR AUTOMOTIVE VEHICLES" and owned by the assignee of the present invention, an acoustic apparatus is mounted from behind the interior panel into a rectangular aperture formed in the interior panel and only the operating section of the acoustic apparatus projects to the front through the aperture. The front of the acoustic apparatus housing is abutted against the rear surface of the interior panel and they are firmly fixed to each other. In this rear surface mount structure, it is impossible to draw out the acoustic apparatus into the room of the automobile without removing the interior panel, and therefore the protection against the theft of the acoustic apparatus is required little. However, in this type of a mount structure, it is very cumbersome to install the acoustic apparatus.

Many of recent acoustic apparatuses for automobiles use a front mount structure wherein the acoustic apparatus is mounted from the front of an interior panel into a rectangular aperture formed in the interior panel. In this type of a mount structure, the acoustic apparatus housing is made to have a size to be inserted through the rectangular aperture formed in the interior panel and is fixed to the interior panel with the housing inserted in the aperture. A mount structure where mount springs engageable with the rear surface of the interior panel are provided on the opposite side surfaces of an acoustic apparatus housing in one of the well known fashions of a front mount structure. In this structure, if the acoustic apparatus is once mounted into the interior panel, it is not easy to take out the acoustic apparatus from the interior panel and this is desirable in view of the prevention of theft, but the maintenance and inspection or repair of the acoustic apparatus become difficult. It is also known that the front section of an acoustic apparatus housing is formed with a flange section larger than the rectangular aperture and the flange section is fixed to the front surface of the interior panel by screws. A mount structure where wedge members engageable with the rear surface of the interior panel are provided on opposite side surfaces of an acoustic apparatus housing such that they can be depressed, and the wedge members are moved by rotating operating screws secured to the front surface of the acoustic apparatus housing is also known. This wedge type front mount structure is disclosed, for example, in Japanese Laid-Open Patent Application No. 61-53797, laid open on Mar. 17, 1986, and owned by the assignee of the present invention. While the mount structure wherein screws are operated on the front side of the interior panel can facilitate the attachment and detachment of the acoustic apparatus to and from the interior panel, there are many chances that the acoustic apparatus may be stolen.

U.S. Pat. No. 4,494,114, issued on Jan. 15, 1985 and entitled "SECURITY ARRANGEMENT FOR AND METHOD OF RENDERING MICROPROCESSOR-CONTROLLED ELECTRONIC EQUIPMENT INOPERATIVE AFTER OCCURRENCE OF DISABLING EVENT" has suggested an acoustic apparatus for automobiles that has a microprocessor for rendering the acoustic apparatus inoperative when the acoustic apparatus is moved mechanically from the interior panel. Although this suggestion is quite unique and is quite effective in practice, the cost of the produced acoustic apparatus is high.

SUMMARY OF THE INVENTION

The object of the invention is to provide an acoustic apparatus for automobiles that has a front mount operating type mount structure which can facilitate the attachment and detachment of the acoustic apparatus to and from an interior panel. The acoustic apparatus can detect the detachment of the acoustic apparatus from the interior panel without permission.

According to the present invention, when the detachment of an acoustic apparatus from an interior panel without permission is detected, an exclusive alarm buzer may be actuated, or a known automobile theft preventive apparatus or automobile theft informing apparatus may be triggered. In some cases, the present acoustic apparatus can be used as a trigger of an inactivating circuit disclosed in U.S. Pat. No. 4,494,114 mentioned above.

According to the present invention, an acoustic apparatus for an automobile that can be mounted into an interior panel formed with an aperture such as a dashboard of the automobile can be provided. The acoustic apparatus comprises a housing having a size capable of being inserted into the aperture, the housing including a rear section that is to be positioned behind the interior panel, a front section that is to be exposed on the front side of the interior panel and opposite side surface sections each extending between the rear surface section and the front surface section, mount means for detachably fixing the housing to the interior panel, each of the mount means having a manual mount member for attaching and detaching that is provided on the front surface section of the housing, an electric circuit arrangement positioned in the housing and including switch means capable of being operated from the front the of the interior panel through said aperture, and protective members for covering the manual mount members, the protective members having operating members for the switch means. When the protective members are removed, a detection electric current is passed to the electric current arrangement upon response to the switch means.

According to a preferred embodiment of the present invention, the mount means has a front operating wedge-shaped mount structure as disclosed in Japanese Laid-Open Patent Application No. 61-53797 mentioned above. The electric circuit arrangement includes an alarm buzzer that produces a warning or alarming signal upon response to the removal of the protective member.

BRIEF DESCRIPTION OF THE DRAWINGS

FIG. 2 is a side elevational view, with essential parts in section, of the acoustic apparatus for automobiles shown in FIG. 1; and FIG. 3 is a side elevational view of a modified embodiment of the acoustic apparatus shown in FIG. 2.

DETAILED DESCRIPTION OF THE ILLUSTRATED EMBODIMENT

Figure 1:
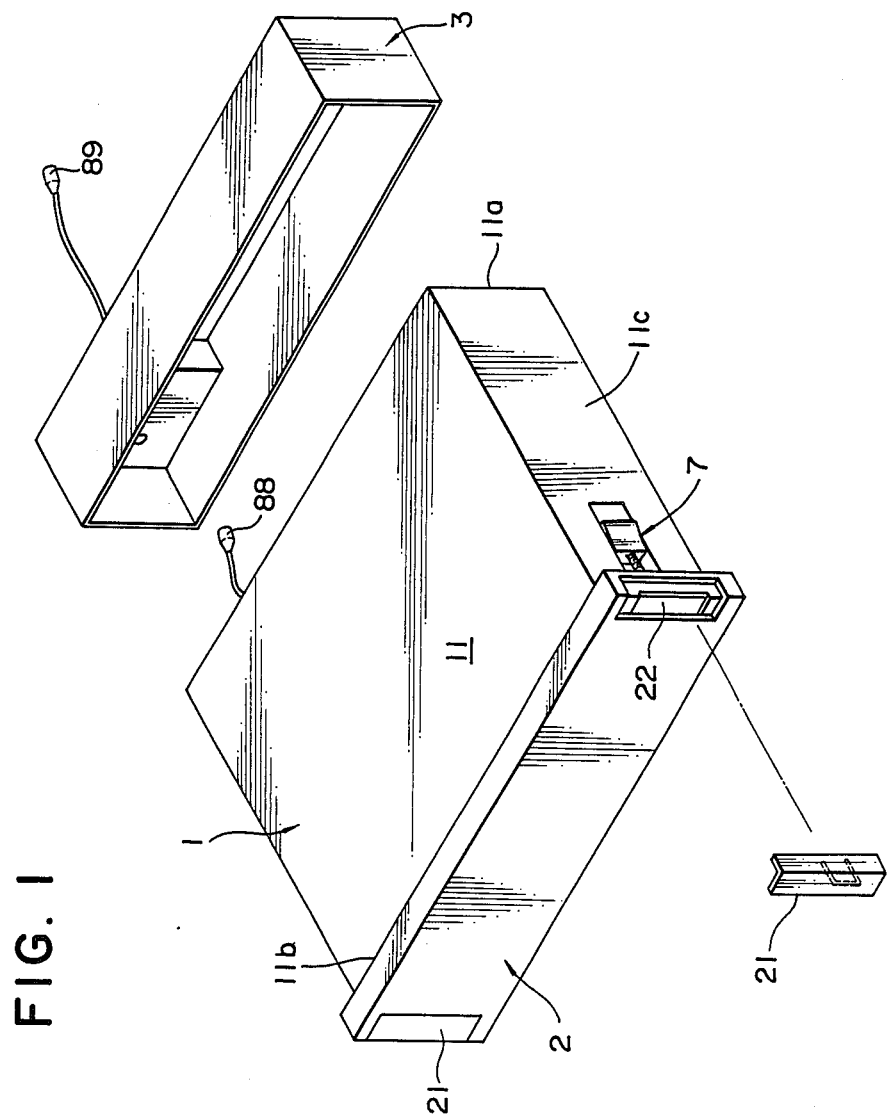
FIG. 1 is a perspective view, with parts exploded, of an acoustic apparatus for automobiles according to the present invention.

Referring to FIGS. 1 and 2, an acoustic apparatus for automobiles has an operating unit 2 on the front of a main body unit 1 and an attachment frame 3 on the rear side of the main body unit 1. Although the operating unit 2 is illustrated roughly for the sake of clarity, the operating unit 2, in practice, is provided with a tuning dial, various operating buttons for a radio receiver and a tape player cassette receiving opening and various operating buttons as disclosed in U.S. Pat. No. 4,211,976 mentioned above. Further, an arrangement required for the radio receiver and a tape player is housed in the main body unit 1.

An interior panel 4 (see FIG. 2) such as a dashboard of an automobile is formed with a rectangular aperture 5, in known manner, to which the acoustic apparatus can be attached. The main body unit 1 includes a housing 11 having a size fittable into the rectangular aperture 5 of the interior panel 4, and the housing 11 has a rear surface 11a that is situated behind the interior panel 4 inside the dashboard, a front surface 11b that is arranged in the aperture 5, and opposite side surfaces 11c each extending between the rear surface 11b and the front surface 11a. Each of the opposite side surfaces 11c of the housing 11 has a front operating and wedge-shaped mount structure 7 secured thereto and is known per se. Because this mount structure is disclosed in above-mentioned Japanese Laid-Open Patent Application No. 61-53797, the mount structure will not be described in detail, but in brief, each of the mount structures has a guide frame 71 secured to the housing side surface 11a, a locking member 72 supported slidably along the guide frame 71 and a lead screw 73 for moving the locking member 72. The lead screw 73 is supported rotatably in the housing 1, and has at its end an operating knob 74 extending out of the front surface 11b of the housing 1. By rotating the operating knob 74, the locking member 72 can be moved along the guide frame 71. In this case, the axis of the lead screw 73 is in an imaginary vertical plane slightly offset from the imaginary vertical plane where the housing side surface 11c is located, and therefore the locking member 72 that is moved along the axis of the lead screw 73 can be positioned in a plane of the housing side surface 11c or can be positioned to project out of the housing side surface 11c according to its location. By means of the mount structure 7, after the housing 11 is inserted into the aperture 5 of the interior panel 4, and when the lead screw 73 is rotated by the operating knob 74 to move the locking member 72 along the lead screw 73 to be projected out of the housing side surface 11c, the locking member 72 is engaged with the interior panel 4 in a wedge-like manner so that the housing 1 can be attached to the interior panel 4 firmly.

The operating unit 2 is firmly fixed to the front surface 11b of the housing 11 of the main body unit 1, and the opposite sides of the operating unit 2 are formed with notches 22 to which detachable protective covers 21 are attached. Each of the protective covers 21 covers the operating knob 4 extending into the notch 22 from the front surface 11b of the main body housing 11, thereby concealing the operating knob 74 from the outside.

According to the present invention, a specific electric circuit arrangement 8 including a switch means 81 operable from the side of the front surface 11b is situated in the housing 11. The electric circuit arrangement 8 includes a theft detector 82 provided in the attachment frame 3 attached to the rear surface of the main body unit 1 and a power source 83 that may be a suitable battery in an automobile and can operate the theft detector 82 in response to ON or Off of the switch means 81. The theft detector 82 may be an alarm buzzer for producing an alarm sound signal or a trigger apparatus for a known automobile theft preventive apparatus or automobile theft informing apparatus. The switch means 81 and the theft detector 82 are connected via a connector 88 and the detector 82 and the powder source 83 are connected similarly via a connector 89. In this embodiment, the switch means 81 consists of two switches 84 and 86 of the same type, and each of the switches 84 and 86 includes a pair of forked contact members 85 that are normally closed and are springy, and insulating blocks 86 supporting the contact members 85. The open ends of the pair of forked contact members 85 of the switch are arranged opposite to the notch 22 of the operating unit 2. On the other hand, the protective cover 21 adaptable to the notch 22 is provided with two switch operating plates 23 of an electrical insulator, and when the protective cover 21 is attached to the notch 22, the switch operating plates 23 are inserted into the pairs of contact members 85 of the associated switch 84 thereby turning the switch means 81 OFF. In contrast, when the protective cover 21 is detached, the switch operating plates 23 is removed from the pairs of contact members 85 to close the switch 84, and the electric circuit arrangement 8 passes a detection current through the contact members 85 and is activated. Thus, the acoustic apparatus can be prevented from being detached without permission. Further, in accordance with this embodiment, since the protective cover 21 has the two switch operating plates 23 secured to the protective cover that are inserted between the pairs of forked contact membes 85 of the respective switches 84 and 86, and clamped by the contact members 85, it would not be required that an additional support structure for attaching the cover 21 to the housing 11 or the operating unit 2.

Referring to FIG. 3, instead of the switches 84 and 86 each having the pairs of forked contact members 85 shown in FIG. 2, a known microswitch 87 is provided and a single operating rod 24 for controlling the microswitch 87 is attached to the protective cover 21.

Although the invention has been described in detail in the foregoing for the purpose of illustration with reference to the preferred embodiments, the invention is not limited by the embodiments. In particular, with respect to the front mount structure, since only a particular embodiment has been decribed, it will be apparent to those skilled in the art that any other known front attaching and operating type mount structure may be selected therefor.

What is claimed is:

1. An acoustic apparatus for an automobile that can be mounted into an interior panel formed with an aperture such as a dashboard of the automobile, the acoustic apparatus comprising: a housing having a size insertable into said aperture, the housing including a rear section that is to be positioned behind said interior panel, a front section that is to be exposed on the front side of said interior panel, and opposite side surface sections each extending between said rear surface section and said front surface section; a plurality of mount means for detachably attaching said housing to said interior panel, each of said mount means having a manual mount member provided in the front surface section of said housing and manually operable for attaching and detaching said housing to and from said interior panel; and electric circuit arrangement disposed in said housing and including switch means operable from the front side of said interior panel through said aperture; and protective members for covering said manual mount members, said protective members having operating members engageable with said switch means for operating said switch means so that, when said protective members are removed from the housing, a detection electric current is passed to said electric circuit arrangement upon operation of said switch means.

2. An acoustic apparatus for an automobile as claimed in claim 1; wherein said switch means comprises a plurality of electric switches each including a pair of normally closed resilient forked contact members, and said operating members comprise plates of electrical insulator for releasing the contact connections of said pairs of contact members by inserting said operating members into said pairs of contact members.

3. An acoustic apparatus for an automobile as claimed in claim 1; wherein said switch means comprises a microswitch.

4. An acoustic apparatus for an automobile as claimed in claim 1; wherein said electric circuit arrangement includes an alarm buzzer.

5. An acoustic apparatus for an automobile as claimed in claim 1; wherein said housing includes an operating unit firmly fixed to its front section, each of said manual mount members can be operated through a notch formed in said operating unit, and each of said protective members is arranged to cover said notch.

6. In an acoustic apparatus having a housing mounted through an interior panel of an automobile so as to expose a front section of the housing on the interior panel: attaching means provided in the housing and manually operable from the exposed housing front section for detachably attaching the housing to the interior panel; alarm means disposed in the housing for producing an alarm signal when activated; switch means disposed on the housing front section and operable for switching the alarm means to activate the same; covering means removably positioned on the housing front section for removably covering the attaching means so as to prevent manual operation of the attaching means; and operating means mounted for movement with the covering means relative to the switch means for operating the switch means when the covering means is removed from the housing front section to thereby activate the alarm means to produce an alarm signal.

7. An acoustic apparatus as claimed in claim 6; wherein the housing has a size and configuration effective to enable the housing to be inserted into an aperture formed in the interior panel.

8. An acoustic apparatus as claimed in claim 6; wherein the housing has a front section exposed on the interior panel, a rear section positioned behind the interior panel, and opposite side sections extending between the front and rear sections.

9. An acoustic apparatus as claimed in claim 6; wherein the housing has a notch in the housing front section and through which the attaching means is manually operated.

10. An acoustic apparatus as claimed in claim 9; wherein the covering means comprises a cover member detachably attached to the housing front section for covering the notch.

11. An acoustic apparatus as claimed in claim 6; wherein the attaching means includes a manually rotatable knob, and a locking member driven by the knob for locking the housing to the automobile interior panel.

12. An acoustic apparatus as claimed in claim 6; wherein the alarm means includes an alarm buzzer for producing an alarm sound signal.

13. An acoustic apparatus as claimed in claim 6; wherein the switch means comprises a microswitch.

14. An acoustic apparatus as claimed in claim 6; wherein the switch means comprises an electrical contact operative when closed to activate the alarm means.

15. An acoustic apparatus as claimed in claim 14; wherein the operating means comprises an electrically insulating member engageable with the electrical contact to open the same when the covering means is positioned on the housing front section, and disengageable from the electrical contact to close the same when the covering means is removed from the housing front section.

* * * * *